(12) United States Patent
Gharout et al.

(10) Patent No.: US 11,349,831 B2
(45) Date of Patent: May 31, 2022

(54) TECHNIQUE FOR DOWNLOADING A NETWORK ACCESS PROFILE (71) Applicant: ORANGE, Paris (FR)

(72) Inventors: Said Gharout, Paris (FR); Laurent Coureau, Morangis (FR)

(73) Assignee: ORANGE, Issy-les-Moulineaux (FR)

( * ) Notice: Subject to any disclaimer, the term of this patent is extended or adjusted under 35 U.S.C. 154(b) by 304 days.

(21) Appl. No.: 16/312,128

(22) PCT Filed: Jun. 19, 2017

(86) PCT No.: PCT/FR2017/051597
§ 371 (c)(1),
(2) Date: Dec. 20, 2018

(87) PCT Pub. No.: WO2017/220904
PCT Pub. Date: Dec. 28, 2017

(65) Prior Publication Data
US 2019/0230087 A1    Jul. 25, 2019

(30) Foreign Application Priority Data

Jun. 24, 2016   (FR) ...................................... 1655913

(51) Int. Cl.
*H04L 9/32*       (2006.01)
*H04L 9/40*       (2022.01)
(Continued)

(52) U.S. Cl.
CPC ........ *H04L 63/0853* (2013.01); *H04L 9/3263* (2013.01); *H04L 63/04* (2013.01);
(Continued)

(58) Field of Classification Search
CPC ... H04L 63/0853; H04L 9/3263; H04L 63/04; H04L 63/067; H04L 63/101;
(Continued)

(56) References Cited

U.S. PATENT DOCUMENTS

| 2009/0138720 A1* | 5/2009 | Jeong | H04N 7/1675 |
| | | | 713/176 |
| 2014/0287725 A1* | 9/2014 | Lee | H04W 12/35 |
| | | | 455/411 |

(Continued)

FOREIGN PATENT DOCUMENTS

EP    2680628 A1    1/2014

OTHER PUBLICATIONS

International Search Report dated Oct. 5, 2017 for corresponding International Application No. PCT/FR2017/051597, filed Jun. 19, 2017.

(Continued)

*Primary Examiner* — Fatoumata Traore
*Assistant Examiner* — Hamid Talaminaei
(74) *Attorney, Agent, or Firm* — David D. Brush; Westman, Champlin & Koehler, P.A.

(57) ABSTRACT

A technique for downloading a profile for access to a communication network by a security module. This access profile has been prepared by a network operator and is available from a server configured to provide this access profile by downloading to the security module. The security module obtains a first verification datum prepared by the network operator. A secure downloading session is established thereafter. During establishment, session keys are jointly generated between the server and the security module and the server is authenticated by the security module using a public downloading key. The security module verifies authenticity of the public downloading key by using the first verification datum enabling verification that the server uses a secret downloading key corresponding to that provided by the network operator during preparation of the first verification datum. When the public downloading key is not (Continued)

authentic, the security module interrupts downloading of the access profile.

10 Claims, 3 Drawing Sheets

(51) Int. Cl.
*H04W 4/60* (2018.01)
*H04W 4/50* (2018.01)
*H04W 8/20* (2009.01)
*H04W 12/06* (2021.01)
*H04W 12/30* (2021.01)
*H04W 12/041* (2021.01)
*H04W 12/50* (2021.01)
*H04W 12/069* (2021.01)
*H04L 29/06* (2006.01)

(52) U.S. Cl.
CPC .......... *H04L 63/067* (2013.01); *H04L 63/101* (2013.01); *H04W 4/60* (2018.02); *H04W 8/205* (2013.01); *H04W 12/041* (2021.01); *H04W 12/068* (2021.01); *H04W 12/069* (2021.01); *H04W 12/50* (2021.01); *H04W 4/50* (2018.02)

(58) Field of Classification Search
CPC ......... H04W 12/0608; H04W 12/0609; H04W 12/0401; H04W 12/003; H04W 8/205; H04W 4/60; H04W 4/50
See application file for complete search history.

(56) References Cited

U.S. PATENT DOCUMENTS

2015/0143125 A1* 5/2015 Nix ........................ H04W 12/04
713/171
2016/0302061 A1* 10/2016 Park ........................ H04L 9/0825

OTHER PUBLICATIONS

Written Opinion of the International Searching Authority dated Oct. 5, 2017 for corresponding International Application No. PCT/FR2017/051597, filed Jun. 19, 2017.

GSM Association. "RSP Technical Specification, Version 1.1" GSM Association, SGP.22, v1.1. Jun. 9, 2016.

"RSP Architecture, version 1.0." GSM Association SGP.21. Dec. 23, 2015.

"Secure Channel Protocol '11'—Card Specification v2.2—Amendment F, version 1.0." GlobalPlatform Card, GlobalPlatform. May 2015.

GSM Association. "Remote Provisioning Architecture for Embedded UICC Technical Specification: version 3.1." GSM Association, SGP.02, V3.1. May 27, 2016.

English Translation of the Written Opinion of the International Searching Authority dated Oct. 12, 2017 for corresponding International Application No. PCT/FR2017/051597, filed Jun. 19, 2017.

* cited by examiner

TECHNIQUE FOR DOWNLOADING A NETWORK ACCESS PROFILE

CROSS-REFERENCE TO RELATED APPLICATIONS

This Application is a Section 371 National Stage Application of International Application No. PCT/FR2017/051597, filed Jun. 19, 2017, the content of which is incorporated herein by reference in its entirety, and published as WO 2017/220904 on Dec. 28, 2017, not in English.

FIELD OF THE DISCLOSURE

The invention pertains to the general field of telecommunications.

The invention relates more particularly to a technique for downloading an access profile for access to a communication network by a security module.

BACKGROUND OF THE DISCLOSURE

The downloading technique is situated in the field of mobile communication terminals, and more particularly so-called embedded eUICC cards. An embedded eUICC card allows a mobile user device to operate with subscriptions with several operators with one and the same eUICC card which may be non-removable.

The GSMA (for "Global System for Mobile Communications") association is developing technical specifications for a card of "eUICC" type (standing for "embedded Universal Integrated Circuit Card") playing the role of a security module, envisaged to be embedded in a mobile user device. Such a security module may be non-removable and it is then necessary to perform remote actions, for example reprogram it. The GSMA's technical specification "SGP.22—RSP Technical Specification" v.1.1 dated Jun. 9, 2016 (available on the GSMA's site at the address http://www.gsma.com/newsroom/all-documents/sgp-22-technical-specification-v1-1/) specifies remote configuration management of an eUICC card (or security module). Thus, when acquiring a new mobile terminal, it is no longer necessary to manipulate the security module beforehand in order to access an operator's network, or indeed to change it upon a change of operator. An access profile corresponds to a set of data and of applications which allow the mobile terminal, once the profile has been activated, to access an operator's network. It is envisaged that a user be able to subscribe directly via a man-machine interface of his user device, or by going to a store of the operator or/and that he install an access profile in respect of the network. It is also envisaged that he be able to change operator in the same manner.

For this purpose, the user obtains an activation code AC allowing him to contact a server tasked with the preparation of the subscription management data SM-DP+(for "Subscription Manager Data Preparation+") so as to download an access profile which has been prepared for him. This activation code comprises in particular an address of the SM-DP+ server to be contacted to obtain the access profile and an identifier of the latter. This SM-DP+ server has at its disposal in particular a public downloading key certificate signed by an entity CI (for "Certificate Issuer") for use during association of a profile folder (known as "Profile Package Binding"). This public downloading key certificate is used during the exchanges between the SM-DP+ server and the security module, so as to guarantee to the security module that it is indeed connected to the SM-DP+ server which has been identified by the operator that provided the activation code. The certificate is signed by means of a private key of the entity CI. Security during the downloading of the access profile then relies on the trust that the network operator has in this SM-DP+ server and in the authority which generated the public downloading key certificate.

The private key of the entity CI could be stolen by a device attacking the entity CI. Certificates could then be signed by this attacking device with the aid of the private key stolen for SM-DP+ servers. False profiles could then be installed in the security module with the aid of valid activation codes, without this being detected by the security module.

SUMMARY

One of the aims of the invention is to remedy inadequacies/drawbacks of the prior art and/or to afford improvements thereto.

According to a first aspect, the subject of the invention is a method for downloading an access profile for access to a communication network by a security module, said access profile being prepared for a user by a network operator and available at a server configured to provide by downloading to the security module said access profile. This method comprises:

- an obtaining by the security module of a first verification datum prepared by said network operator;
- an establishment of a secure downloading session, in the course of which session keys are generated jointly between the server and the security module and in which the server is authenticated by the security module by means of a public downloading key;
- a verification by the security module of the authenticity of the server's public downloading key by means of the first verification datum;
- when the public downloading key is not verified authentic, an interruption of the downloading of the access profile.

More precisely, the verification of the authenticity of the server's public downloading key by means of the first verification datum makes it possible to verify that the server uses a secret downloading key corresponding to that envisaged by the network operator during the preparation of the first verification datum.

The downloading method derives its origin from a problem noted in respect of the implementation of an access profile on a security module of eUICC card type. It is however applicable to other types of security modules, such as those hosted remotely in the network or else those implemented by the mobile terminal itself.

It is thus possible to verify before the actual downloading of the access profile that the server able to provide by downloading to the security module this access profile, also called server tasked with the preparation of the subscription management data, does indeed have at its disposal a pair of downloading keys, private key and associated public key, whose public downloading key corresponds to the one known to, or expected by, the network operator. The first verification datum has been prepared by the network operator and is thus provided outside of the exchanges with the server. The first verification datum corresponds for example to a digest of the server's public downloading key. When the public downloading key is not verified authentic, the establishment of the secure downloading session is interrupted and consequently, the same holds for the downloading procedure. In the converse case, the downloading procedure can continue with session keys generated jointly between the server and the security module (subject to the result of other verifications of authentication data if relevant). The implementation of the method thus makes it possible to improve the security of downloading of an access profile, while not verifying solely an identity of the server able to provide by downloading to the security module this access profile and an authenticity of certificates of public downloading key of the server.

The verification that the public downloading key is authentic by means of the first verification datum is performed at the moment of the exchanges between the server and the security module for an establishment of a secure session with mutual authentication making it possible to generate session keys to encipher the access profile. The server therefore uses its private downloading key with which the public downloading key is associated to authenticate itself to the security module during the generation of the session keys. This is the last exchange with the server before the actual downloading of the access profile. This verification therefore occurs as close as possible to the downloading so as to protect the downloading of the access profile. This allows the operator to control the distribution of his access profiles and to ensure that the access profile is installed in the security module envisaged on the basis of the expected SM-DP+ server.

In a first example, when the private key of the entity issuing the certificates is compromised, an attacker can establish false public key certificates for a malicious SM-DP+ server and download false access profiles into the security module. Verification that the server's public downloading key does indeed correspond to the one envisaged by the network operator makes it possible to avoid possible downloading of false access profiles. Thus, the downloading of the access profile is protected even if the issuer of certificates that has signed the SM-DP+ server's public key certificate is attacked.

In a second example, the SM-DP+ server may have several public downloading key certificates at its disposal, issued by several certificate issuing entities. The network operator thus has the guarantee that the server will indeed use the downloading key pair which he trusts, either because he provided it himself, or because it was provided by a trusted entity.

The verification of the authenticity of the public key by means of the first verification datum thus prevents the SM-DP+ server from installing the access profile with another certificate which would be less protected than the one envisaged for the distribution of the profile.

The first verification datum is for example provided to the user device when obtaining an activation code prepared by the network operator. This activation code comprises the necessary data required by the user device to download the access profile which has been prepared for it.

In a particular embodiment, the server has at its disposal three pairs of keys: a first dedicated to the establishment of a secure connection with the user device, a second dedicated to the authentication by the security module of the server and the third dedicated to the downloading phase. The implementation of the method therefore makes it possible to guarantee that the server does indeed use the pair of downloading keys during the downloading phase.

In a particular embodiment, a phase of authentication of the server is performed by the security module prior to the establishment of a secure downloading session. This authentication can be mutual.

The various embodiments or characteristics of realization mentioned hereinafter can be added independently or in combination with one another, to the downloading method such as defined previously.

In a particular embodiment of the downloading method, the establishment of the secure downloading session is triggered by a reception by the security module of a request to open a secure downloading session, said request comprising a one-time public key, generated by the server, for a matching of session keys and a signing of the data of said request by means of a private downloading key, with which the public downloading key is associated, of the server.

This one-time public key is used subsequently to generate in a joint manner the session keys. The session keys are generated, for example, on the basis of a key matching between the server and the security module. This is an authenticated key matching where the private keys of the two entities are used to provide the authentication during the generation of the session keys. It is therefore important to have the assurance that the server has indeed used the private downloading key to sign the data of the message, of which this one-time key.

According to a particular characteristic of the downloading method, the verification of the authenticity is performed during a reception by the security module of a request for preparation of the downloading, said request comprising a public downloading key certificate of the server, prior to the reception of the request to open a secure downloading session.

In these exchanges for the preparation of the downloading, the security module receives the public downloading key certificate of the server and verifies the authenticity of this certificate. Verification of the authenticity of the public downloading key at this juncture of the exchanges thus allows earlier interruption of the downloading procedure when the public downloading key does not correspond to the public key envisaged by the network operator.

According to a particular characteristic of the downloading method, the security module furthermore obtains a second verification datum, verifies by means of the second verification datum a public authentication key of the server, received during a phase of authentication of the server by the security module, and when the public authentication key is not verified authentic, interrupts the downloading of the access profile.

In this particular embodiment, the server has at its disposal at least two public key certificates, a first dedicated to the authentication and a second dedicated to the downloading of the access profile properly speaking.

This makes it possible to strengthen the securing of the downloading procedure by detecting that the server does not use the key pair envisaged for authentication.

The second verification datum is for example provided to the user device during the obtaining of an activation code prepared by the network operator in association with the first verification datum.

According to a particular characteristic of the downloading method, the verification of the authenticity of the public authentication key is performed during the phase of authentication of the server by the security module.

This makes it possible to strengthen the securing of the downloading procedure by detecting at the moment of authentication that the server is not using the key pair envisaged for authentication.

Alternatively, according to a particular characteristic of the downloading method, the verification of the authenticity of the public authentication key is triggered subsequent to the reception of the request to open a secure downloading session.

This makes it possible not to modify the actions of the security module during the phase of authentication of the server, while strengthening the security as regards the use by the server of a private authentication key associated with a public authentication key envisaged by the network operator.

In a particular embodiment of the downloading method, the establishment of the secure downloading session is triggered by a reception by the security module of a request for executing a security operation, said request comprising the public downloading key intended to contribute to the generation of the session keys.

In this particular embodiment, to generate the session keys, the server uses the private downloading key and the security module uses the public downloading key of the server. It is therefore important to verify that the server does indeed use the private downloading key envisaged by the network operator.

According to a second aspect, the invention also relates to a security module comprising:
 a send/receive sub-module, designed to obtain a first verification datum prepared by a network operator;
 a control sub-module, designed to establish a secure downloading session, in the course of which session keys are generated jointly between a server, at which an access profile prepared by said network operator is available for downloading, and the security module and in which the server is authenticated by the security module by means of a public downloading key, to verify the authenticity of the server's public downloading key by means of the first verification datum making it possible to verify that the server uses a secret downloading key corresponding to that envisaged by the network operator during the preparation of the first verification datum and to trigger an interruption of the downloading of the access profile when the public downloading key is not verified authentic.

This security module can of course comprise in structural terms the various characteristics, which can be combined or taken in isolation, relating to the downloading method such as described previously. Thus, the advantages stated for the downloading method according to the first aspect are directly transposable to the security module. Consequently, they are not detailed more fully.

According to a third aspect, the invention also relates to a terminal designed to communicate with a server at which an access profile prepared by a network operator is available for downloading, said terminal comprising:
 a module for obtaining a first verification datum prepared by said network operator;
 a control module, designed to establish a secure downloading session, in the course of which session keys are generated jointly between the server and a security module and in which the server is authenticated by the security module by means of a public downloading key, to verify the authenticity of a public downloading key of the server by means of the first verification datum making it possible to verify that the server uses a secret downloading key corresponding to that envisaged by the network operator during the preparation of the first verification datum and to trigger an interruption of the downloading of the access profile when the public downloading key is not verified authentic.

This terminal can of course comprise in structural terms the various characteristics, which can be combined or taken in isolation, relating to the downloading method such as described previously. Thus, the advantages stated for the downloading method according to the first aspect are directly transposable to the terminal. Consequently, they are not detailed more fully.

According to a fourth aspect, the invention relates to a program for a security module, comprising program code instructions intended to drive the execution of the steps of the previously described downloading method which are implemented by the security module, when this program is executed by this module and a recording medium readable by a security module on which a program for a module is recorded.

The advantages stated for the downloading method according to the first aspect are directly transposable to the program for a security module and to the recording medium.

BRIEF DESCRIPTION OF THE DRAWINGS

The technique for downloading an access profile for access to a communication network by a security module will be better understood with the aid of the following description of particular embodiments, with reference to the appended drawings in which.

DETAILED DESCRIPTION OF ILLUSTRATIVE EMBODIMENTS

Figure 1:
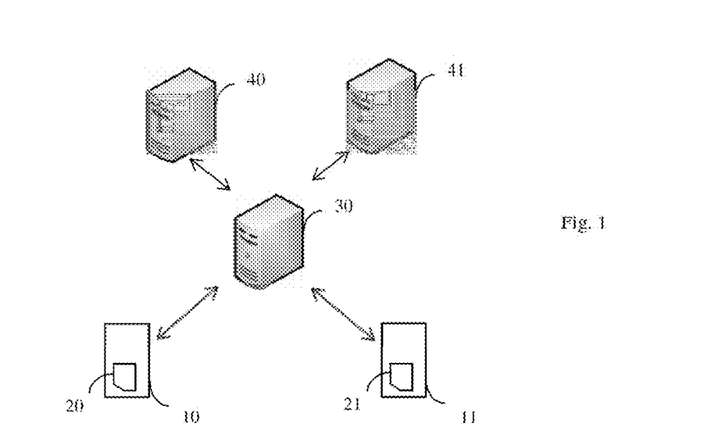
FIG. 1 represents an environment in which the downloading method is implemented in a particular embodiment.

FIG. 1 represents an environment in which the method for downloading an access profile for access to a communication network is implemented by a security module in a particular embodiment.

In the subsequent description, examples are presented of several embodiments applying to a security module of eUICC card type such as undergoing standardization within the framework of the GSMA association, but the downloading method also applies to other types of security module. More generally, the security module is an inviolable dedicated platform, comprising hardware and software, able to host in a secure manner applications and their confidential and cryptographic data and providing a secure environment for the execution of applications, for example a card of UICC type.

The description which follows falls within the context of the technical specifications, such as are defined by the GSMA association. More precisely, the architecture of the remote configuration management is defined in the technical specification "RSP Architecture", version 1.0, dated 23 Dec. 2015 and the procedures are defined in the technical specification "SGP.22—RSP Technical Specification" v.1.1 dated Jun. 9, 2016.

A user device 10, with which a security module 20 is associated, is designed to access the network of a mobile operator by means of an access profile for accessing the network generated by this operator for this security module. The user device in association with the security module form a mobile terminal. More precisely, the access profile is generated for this security module by a subscription data management server, not represented in FIG. 1, bound to the operator. The access profile comprises a network access application and associated access data (one speaks of "credentials"), such as algorithms and cryptographic keys. The access profile in particular makes it possible to authenticate the mobile terminal, more precisely the security module 20 upon access to the operator's network. A second user device 11 and its associated security module 21 are also represented in FIG. 1.

The security module 20, 21 is typically a card of "eUICC" type (standing for "embedded Universal Integrated Circuit Card"), also called "eSIM" ("embedded Subscriber Identity Module"), or non-removable SIM card. No limitation is attached to this type of card. In a particular embodiment, the security module 20, 21 is a chip card with an operating system offering the functionalities of a card of eUICC type. In another particular embodiment, the security module 20, 21 is integrated into the terminal 10, 11 thus forming a single entity.

The security module 20, 21 stores a pair of keys: a private key SK.EUICC.ECDSA specific to the security module 20,21 and used to sign data, and an associated public key PK.EUICC.ECDSA. A public key certificate CERT.EUICC.ECDSA, for example a certificate of type X509, has been issued to certify the public key PK.EUICC.ECDSA by a GSMA certificate issuer CI 40 (for "Certificate Issuer") or by the manufacturer of the card EUM (for "eUICC Manufacturer"). In the latter case, the certificate of the manufacturer of the card EUM is signed by the GSMA certificate issuer CI 40. This allows the security module 20 to be authenticated by all the entities recognizing the certificate issuer 40.

This certificate issuer 40 is for example used for a first region. A second GSMA certificate issuer 41 is also represented in FIG. 1. This certification issuer 41 is for example used for a second region.

In FIG. 1 is also represented a server 30 able to provide by downloading to a security module an access profile which has been prepared for it. This server is tasked with the preparation of the subscription management data SM-DP+ (for "Subscription Manager Data Preparation"). The role of this server is to:
prepare profile folders ("Profile Package"),
store profile protection keys in a secure manner and profile folders protected in a memory area and
allocate profile folders as a function of a security module identifier.

The server 30 binds a protected profile folder to a security module and downloads, once a secure downloading session has been established, this or these bound access profiles to an application LPA (for "Local Profile Assistant"). This application LPA can according to the embodiments be executed in the user equipment 10 or in the security module 20.

In the embodiment described, the server 30 has at its disposal three pairs of keys: a first dedicated to the establishment of a secure connection TLS (for "TLS Transport Layer Security") with the user device, a second dedicated to the authentication of the server by the security module and the third dedicated to the downloading phase properly speaking.

The first pair of keys comprises a private key SK.DP.TLS specific to the server 30 and an associated public key PK.DP.TLS. A public key certificate CERT.DP.TLS has been issued by the certificate issuer 40 to certify the public key PK.DP.TLS.

The second pair of keys, dedicated to the authentication phase, comprises a private key SK.DPauth.ECDSA specific to the server 30 and used to sign data, and an associated public key PK.DPauth.ECDSA. A public key certificate CERT.DPauth.ECDSA has been issued by the certificate issuer 40 to certify the public key PK.DPauth.ECDSA.

The third pair of keys, dedicated to the downloading phase properly speaking, comprises a private key SK.DPpb.ECDSA specific to the server 30 and used to sign data, and an associated public key PK.DPpb.ECDSA. A public key certificate CERT.DPpb.ECDSA has been issued by the certificate issuer 40 to certify the public key PK.DPpb.ECDSA.

It is emphasized here that in a particular embodiment, the server 30 may be tasked with the preparation of the subscription management data for various network operators, one of which is attached to the first region, managed by the certificate issuer 40, and another of which is attached to the second region, managed by the certificate issuer 41.

In this case, the server 30 stores for each of the certificate issuers 40, 41, three pairs of keys.

Figure 3:
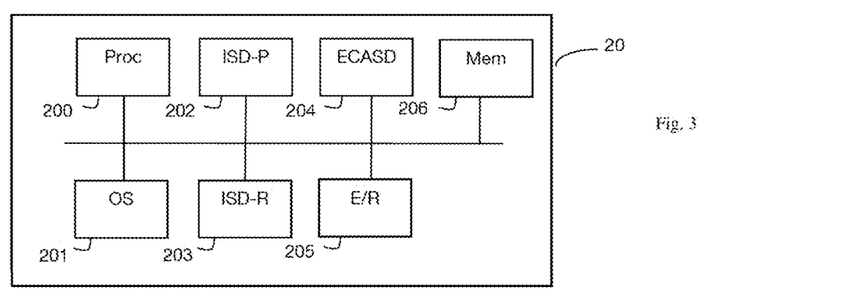
FIG. 3 represents a security module according to a particular embodiment.

FIG. 3 illustrates in a schematic manner a security module 20 in a particular embodiment. The security module 20 comprises in particular:
a processor 200 for executing code instructions of software modules;
a memory area 206, designed to store an application which comprises code instructions for implementing the steps of the downloading method;
a storage memory, not represented, designed to store data used during the implementation of the downloading method;
an operating system sub-module 201;
a sub-module ISD-P 202, designed to store an access profile;
a sub-module ISD-R 203;
a security control sub-module ECASD 204;
an interface sub-module 205 (called ES10b) for interfacing with the user device.

It is emphasized here that the security module 20 also comprises other processing sub-modules, not represented in FIG. 3, designed to implement the various security module functions.

The security control sub-module 204 ECASD (for "Embedded UICC Controlling Authority Security Domain") is designed to store in a secure manner authentication data and to provide the following services to the sub-modules ISD-P 202 and ISD-R 203: sign data which are provided to it by means of its secret key SK.EUICC.ECDSA and verify certificates at the request of these sub-modules with a public key of the certificate issuer PK.CI.ECDSA.

The authentication data stored in the sub-module ECASD are in particular the following:
the private key of the security module SK.EUICC.ECDSA, the public key certificate of the security module CERT.EUICC.ECDSA, comprising the public key PK.EUICC.ECDSA;
the public key of the certificate issuer PK.CI.ECDSA.

Other functions of the security control sub-module ECASD 204 are described subsequently in relation with FIGS. 2a and 2b.

The sub-module 202 ISD-P (for "Issuer Security Domain Profile") is designed to download and install an access profile and to host it in a secure container.

The sub-module 203 ISD-R (for "Issuer Security Domain Root") is designed to create one or more sub-modules 202 ISD-P and to manage their life cycles.

Other functions of the sub-module ISD-R 203 are described subsequently in relation with FIGS. 2a and 2b.

The method for downloading an access profile for access to a communication network by the security module 20 will now be described in relation with FIG. 2a.

Figure 2A:
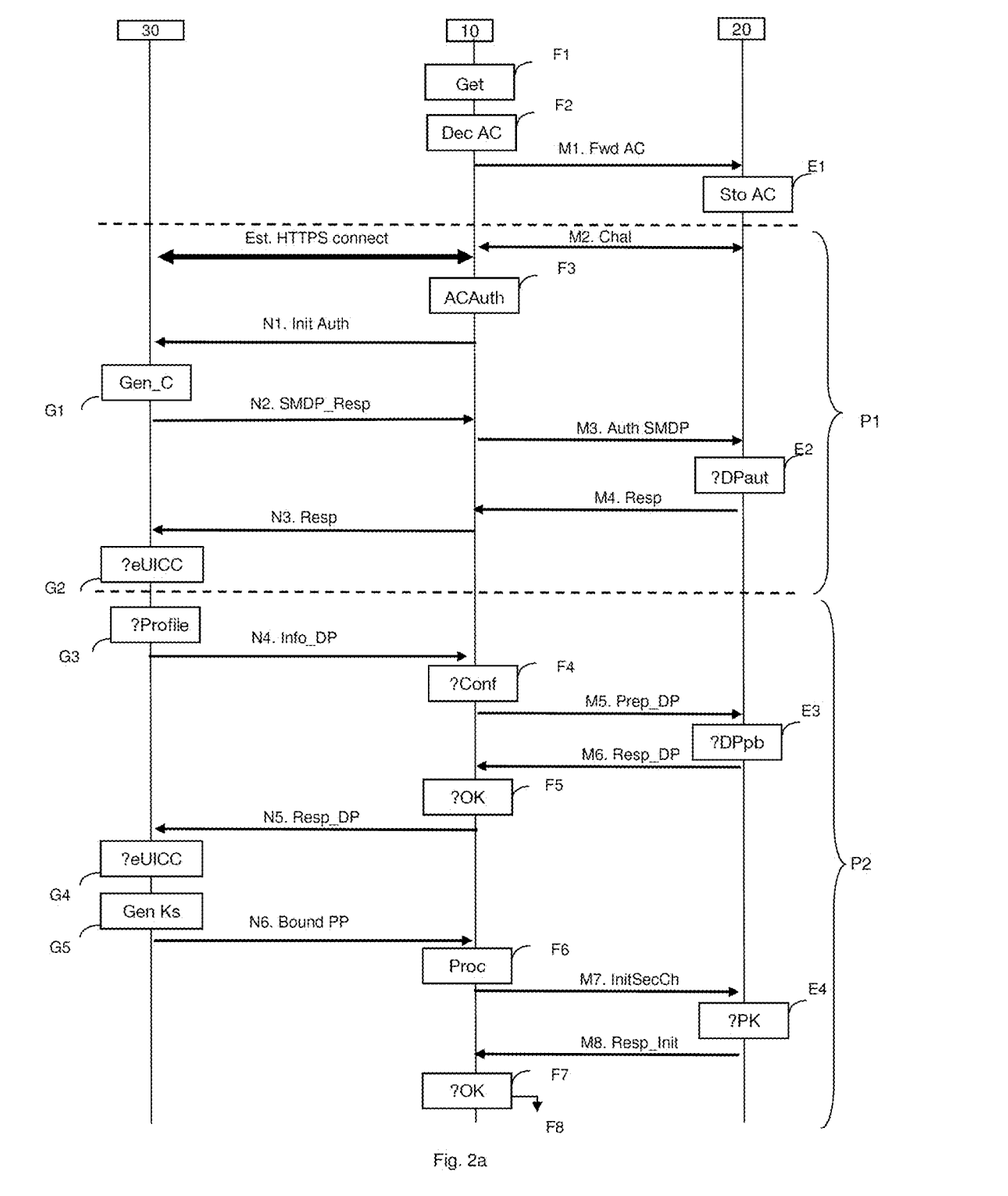
FIG. 2a illustrates steps of a method for downloading an access profile for access to a communication network according to a particular embodiment.

FIG. 2a illustrates a particular embodiment where the application LPA executes in the user equipment 10. When the application LPA executes in the security module 20, the messages in particular exchanged on the interface ES10b become messages internal to the security module 20.

In the initial state, it is assumed that the user of the user device 10 and of the security module 20 has taken out a subscription with a communication network operator. In return, he obtains an activation code AC which will allow him to install on the security module 20 an access profile for access to the network in a sub-module ISD-P 202. Once the access profile has been installed, the user can access the communication network and services provided by the operator of the network within the framework of his subscription contract.

As defined in paragraph 4.1 of the technical specification SG.22, an activation code AC corresponds to a string of characters and comprises various information elements separated by a "$" character. The activation code AC comprises in particular an address of the server 30 to be contacted to obtain the access profile, a token for access to the profile and an identifier of the server 30. It is well understood that this list is not exhaustive.

In the particular embodiment which is described, the activation code AC furthermore comprises a first verification datum. This first verification datum is prepared by the network operator and is intended to allow a verification of an authenticity of the public downloading key PK.DPpb.ECSDA of the server 30, whose address and identifier are provided in the activation code. This public downloading key PK.DPpb.ECSDA of the server 30 corresponds to the one known to, or expected by, the network operator for the downloading of the access profile. It is for example the result of applying a one-way function, such as a hash function, to the public downloading key. The hash function is for example the function SHA-2, SHA-256 or SHA-3. No limitation is attached to these examples of hash functions. In a particular embodiment, only part of this result is provided in the activation code.

Subsequently, the exchanges between the user device 10 and the security module 20 are performed by way of the interface sub-module 205.

In a step F1, the user device 10 obtains the activation code AC. The activation code AC can be input manually by the user by way of a man-machine interface of the user device 10. It can also be read in the form of a barcode, of a QR-code.

In a step F2, the user device 10 decodes the activation code so as to obtain the data relating to the server 30 to be contacted (address of the server and identifier of the latter SM-DP+ OID) as well as the profile access token (MatchingID). Still in this step F2, the user device 10 transmits the activation code AC to the security module 20 in a message M1. In a particular embodiment, only the first verification datum is transmitted. In the particular embodiment where the application LPA executes in the security module 20, the latter obtains the activation code AC directly.

The security module 20 obtains or receives the activation code AC, or the first verification datum if relevant, in a step E1 and stores it for example in the sub-module ISD-R 203.

A phase P1 of mutual authentication between the server 30 and the security module 20 is then executed.

The user device 10 obtains a challenge eUICC-Challenge in a message M2 of the security module 20.

The user device 10 establishes a secure connection TLS with the server 30. During this step, the user device 10 verifies that the certificate CERT.DP.TLS is valid. Version 1.2, as defined in the IETF document RFC 5246, of the protocol for securing the exchanges TLS (for "Transport Layer Security") is the minimum version to be used.

In a step F3, the user device 10 dispatches an authentication initialization message N1 ("ESDP.InitiateAuthentication") to the server 30. This message N1 comprises in particular the challenge eUICC-Challenge provided by the security module 20.

In a step G1, the server 30 performs various verifications, not detailed here, and generates a transaction identifier TransactionID, making it possible to uniquely identify the downloading session, and a challenge SMDP-Challenge. These data generated, the challenge eUICC-Challenge and the address of the server 30 are grouped together into a data structure, which is signed by the server 30 by means of the private authentication key SK.DPauth.ECDSA. The server 30 then dispatches a message N2 to the user device 10, this message comprising in particular the transaction identifier TransactionID, the data structure, the calculated signature and the public authentication key certificate CERT.DPauth.ECDSA.

The user device 10 transmits the message received to the security module 20 in the form of a message M3 ("ES10b.AuthenticateServer") requesting the security module 20 to authenticate the server 30. This message M3 is received in a step E2 by the security module 20. Still in this step E2, the security module 20 verifies the data received, in particular the certificate CERT.DPauth.ECDSA, the signature by means of the key PK.DPauth.ECDSA, generates a pair of one-time keys ECKA (otSK.EUICC.ECKA, otPK.EUICC.ECKA). The security module 20 groups together into a data structure in particular the transaction identifier, the challenge SMDP-Challenge, the one-time public key generated otPK.EUICC.ECKA and signs this data structure by means of the secret key SK.EUICC.ECDSA. The security module 20 dispatches the response message M4 to the user device 20, this message M4 comprising in particular the data structure, the signature of the latter as well as the certificate CERT.UICC.ECDSA. The user device 10 transmits these data to the server 30 in a message N3 requesting authentication ("ESDP.AuthenticateClient") of the security module by the server 30, which receives them in a step G2.

Still in this step G2, the server 30 verifies in particular the certificate CERT.UICC.ECDSA and the signature received.

Once these verifications have been performed (some are not detailed here), the phase of mutual authentication is terminated, the phase of downloading P2 of the access profile properly speaking can start.

In a step G3, the server 30 verifies whether a profile download order is pending for the access token provided MatchingID. It is considered that such is the case and that the verifications performed by the server 30 are positive. The server 30 then generates a data structure comprising in particular the transaction identifier TransactionID, the profile metadata corresponding to the profile identified by the access token and signs this data structure by means of the private key SK.DPpb.ECDSA. Still in this step G3, the server 30 dispatches in a message N4 the transaction identifier, the data structure, the signature and the public key certificate CERT.DPpb.ECDSA.

This message N4 is received by the user device 10 in a step F4. The user device 10 can if relevant request the user for confirmation of the downloading of the access profile, by displaying the name of the access profile for example, by way of the man-machine interface. The user device 10 thereafter dispatches a download preparation request M5 ("ES10b.PrepareDownload") to the security module 20. This request M5 comprises the data structure received, the signature of the latter and the server's public downloading key certificate CERT.DPpb.ECDSA.

This request M5 is received by the security module 20 in a step E3. Still in this step E3, the security module 20 verifies:
 the certificate CERT.DPpb.ECDSA received,
 that the certificates CERT.DPauth.ECDSA and CERT.DPpb.ECDSA do indeed have the same owner,
 the signature received,
 the data structure received.

Next, the security module 20 generates a data structure comprising in particular the transaction identifier, and signs the data structure by means of the private key SK.EUICC.ECDSA. The security module 20 also stores the public downloading key of the server 30 PK.DPpb.ECDSA for example in the sub-module ISD-R 203.

Still in this step E3, the security module 20 dispatches to the user device 10 a response message M6, comprising in particular the data structure and the signature of the latter.

In a step F5, the user device 10 verifies the message received and transmits a response message N5 ("ES9+.GetBoundProfilePackage") to the server 30, this message N5 comprising the data received in the message M6.

The message M6 is received by the server 30 in a step G4. Still in this step G4, the server 30 verifies the signature received by means of the public key PK.EUICC.ECDSA and the data structure received.

The steps which follow allow establishment of a secure downloading session. During this establishment, session keys are generated jointly between the server and the security module and the server is authenticated by the security module by means of the public downloading key PK.DPpb.ECDSA.

In a step G5, the server 30 generates a pair of one-time keys (otPK.DP.ECKA, otSK.DP.ECKA) for a matching of session keys, session keys and a bound profile folder. The one-time public key otPK.DP.ECDSA and optionally other data, are signed by the server 30 with its private key SK.DPpb.ECDSA so as to authenticate the server during the matching of session keys.

The server 30 thereafter dispatches the transaction identifier and the bound profile folder to the user device 10 in a message N6.

The message N6 is received in a step F6 by the user device 10. The user device 10 transfers a call M7 to the function "ES8+.InitialiseSecureChannel" included in the profile folder bound to the security module 20 by repeatedly calling the function "E10b.LoadBoundProfilePackage". This function "ES8+.InitialiseSecureChannel" requests the security module for an opening of a secure downloading session. The input data of the function "ES8+.InitialiseSecureChannel" comprise in particular the one-time public key otPK.DP.ECKA for a matching of session keys and a signature of the data of this function by means of the server's private downloading key SK.DPpb.ECDSA. This data signing makes it possible to authenticate the server 30 when establishing the secure downloading session. In this embodiment, the session keys are generated, for example, on the basis of a key matching between the server and the security module. This is an authenticated key matching where the private keys of the two entities are used to provide authentication when generating the session keys.

This request M7 is received by the security module 20 in a step E4. Still in this step E4, the security module 20 verifies the signature of the data, in particular of the one-time public key otPK.DP.ECDSA for a matching of session keys, by means of the public downloading key PK.DPpb.ECDSA. In the embodiment which is described here, the security module 20 also verifies the authenticity of the public downloading key PK.DPpb.ECDSA of the server 30 by means of the first verification datum. This verification of the authenticity of the public downloading key PK.DPpb.ECDSA can be performed either before or after the verification of the signature received in the request M7. It is recalled here that the first verification datum was provided by the network operator in the activation code or in association with the latter. The public downloading key certificate CERT.DPpb.ECDSA was for its part provided by the server 30 itself. A public downloading key verified authentic signifies that the server 30 has indeed used the secret key associated with the public key dedicated to the downloading phase to sign data and which corresponds to a matching with this network operator. More precisely, the secret key used to sign data must correspond to the one known to, or expected by, the network operator during the preparation of the first verification datum. This verification is particularly important since thereafter session keys are generated by the security module 20 on the basis of the data received in the request M7 and since the downloading of the access profile will be performed. Use of other pairs of keys by the server 30 may compromise the security of the downloading properly speaking. By way of first example, this may be the case when control of the server 30 has been taken by attackers so as to download false access profiles. In a second example, the server 30 may use a key pair which has been certified by a certificate issuer, for example the certificate issuer 41, other than the one chosen by the network operator, the certificate issuer 40. This key pair might not exhibit the security level required by the operator.

Moreover, in the embodiment described, the server 30 has at its disposal three certificates, respectively intended to be used for the securing of the exchanges between the server and the user device CERT.DP.TLS, for the authentication of the server by the security module CERT.DPauth.ECDSA, for the downloading of the access profile CERT.DPpb.ECDSA. Verification of the authenticity of the public downloading key makes it possible to guarantee that the server 30 does not use a certificate other than that dedicated to downloading to download the access profile. This also affords the operator a guarantee as regards the security level used for downloading the access profile.

When the public downloading key is not verified authentic, the security module 20 interrupts the establishment of the secure downloading session. More precisely, the security module 20 dispatches an error message to the user device 10.

When the public downloading key is verified authentic, the security module 20 generates session keys, which will be used during the downloading of the access profile in the security module, as a function of the data received in the request M7. In this case, the security module 20 dispatches a message M8 of response to the user device 10, making it possible to continue the downloading of the access profile properly speaking.

In a step F7, the user device 10 receives the response message M8 originating from the security module. When the response message is an error message, in a step F8, the user device 10 interrupts the downloading of the access profile. The server 30 is notified of the error and a message is displayed destined for the user by means of the man-machine interface of the user device 10. In the converse case, the downloading of the access profile continues by successive exchanges between the user device 10 and the security module 20 on the secure downloading session established.

It is thus noted that the downloading of the access profile does not take place when the public downloading key, and therefore the secret downloading key, did not correspond to those that were defined by the network operator for which an access profile should be downloaded.

In a first variant, the verification of the authenticity of the public downloading key is performed during step E3. It is recalled that this step E3 follows the mutual authentication phase and is prior to the reception E4 of the request to open a secure downloading session. This step E3 follows the reception of a request M5 for preparation of the downloading by the security module 20. It is recalled here that this request M5 comprises a data structure (comprising the transaction identifier and the access profile metadata corresponding to the identified profile), the signature of the latter and the server's public downloading key certificate CERT.DPpb.ECDSA. As described previously, in this step E3, the security module 20 verifies in particular the certificate CERT.DPpb.ECDSA received and whether the same identifier is indeed associated with the certificates CERT.D-Pauth.ECDSA and CERT.DPpb.ECDSA. In this first variant, the security module 20 furthermore verifies the authenticity of the server's public downloading key by means of the first verification datum. When the public downloading key is not verified authentic, the security module 20 interrupts the establishment of the secure downloading session by dispatching an error message to the user device 10, this error message bringing about an interruption of the downloading of the access profile by the user device. This verification makes it possible, in addition to the advantages described previously, to detect earlier in the exchanges that the server 30 is not using the public downloading key envisaged by the network operator. It is also mentioned that a malicious server 30 could use in this step the public downloading key certificate in accordance with the expectations of the network operator but use during step G5 of generating the one-time keys a public key certificate which does not correspond to the one expected by the network operator. The two verifications of authenticity are thus complementary.

In a second variant, cumulative or alternative to the first variant, the activation code AC obtained by the user device 10 furthermore comprises a second verification datum. This second verification datum makes it possible to verify that the public authentication key PK.DPauth.ECDSA is authentic and corresponds to that expected by the network operator. This entails for example the result of applying a one-way function, such as a hash function, to the public authentication key. The hash function is for example the function SHA-2, SHA-256 or SHA-3. No limitation is attached to these examples of hash functions. In a particular embodiment, only part of this result is provided in the activation code.

A first exemplary implementation of this second variant is described, in which the use of the second verification datum is performed during the mutual authentication phase.

In step E1, the security module 20 receives the activation code AC, or the first and second verification data if relevant, and store them in the security module 20 for example in the sub-module ISD-R 203.

The phase P1 of mutual authentication between the server 30 and the security module 20 is then executed. The user device 10 obtains a challenge eUICC-Challenge in a message M2 of the security module 20. The user device 10 establishes a secure connection TLS with the server 30. During this step, the user device 10 verifies that the certificate CERT.DP.TLS is valid. In a step F3, the user device 10 dispatches an authentication initialization message N1 to the server 30. This message N1 comprises in particular the challenge eUICC-Challenge provided by the security module 20. In a step G1, the server 30 performs various verifications and generates a transaction identifier TransactionID making it possible to uniquely identify the downloading session and a challenge SMDP-Challenge. Once these data have been generated, the challenge eUICC-Challenge and the address of the server 30 are grouped together in a data structure, which is signed by the server 30 by means of the private authentication key SK.DPauth.ECDSA. The server 30 then dispatches a message N2 to the user device 10, this message comprising in particular the transaction identifier, the data structure, the calculated signature and the public authentication key certificate CERT.DPauth.ECDSA. The user device 10 transmits the message received to the security module 20 in the form of a message M3 requesting to authenticate the server 30. This message M3 is received in a step E2 by the security module 20.

Still in this step E2, the security module 20 verifies the data received, in particular the certificate CERT.DPauth.ECDSA, the signature by means of the key PK.DPauth.ECDSA and generates a one-time key pair.

In this second variant, the security module 20 verifies that the server's public authentication key PK.DPauth.ECDSA is authentic by means of the second verification datum. This second verification datum thus makes it possible to verify that the public authentication key PK.DPauth.ECDSA is authentic and corresponds to that expected by the network operator. When the public authentication key is not verified authentic, the security module 20 interrupts the downloading of the access profile by dispatching to the user device 10. This error message brings about an interruption of the downloading of the access profile by the user device. When the public authentication key is verified authentic, the mutual authentication phase continues as described previously.

A second exemplary implementation of this second variant is described, in which the use of the second verification datum is performed during the downloading phase P2. More precisely, the verification that the public authentication key is authentic by means of the second verification datum is performed during step E4, before or after the verification that the public downloading key is authentic by means of the first verification datum.

In a third variant, cumulative or alternative to the first or to the second variant, the activation code AC obtained by the user device 10 furthermore comprises a third verification datum. This third verification datum makes it possible to verify that the public key TLS PK.DP.TLS is authentic and corresponds to that expected by the network operator. It entails for example the result of applying a one-way function, such as a hash function, to the public authentication key. The hash function is for example the function SHA-2, SHA-256 or SHA-3. No limitation is attached to these examples of hash functions. In a particular embodiment, only part of this result is provided in the activation code.

It is recalled that, during the establishment of the secure connection TLS with the server 30, the user device 10 verifies that the certificate CERT.DP.TLS is valid. In this third variant, the user device 10 furthermore verifies the authenticity of the public key TLS PK.DP.TLS by means of the third verification datum. This third verification datum thus makes it possible to verify that the public key TLS PK.DP.TLS is authentic and corresponds to that expected by the network operator. When the public key PK.DP.TLS is not verified authentic, the user device 10 interrupts the downloading of the access profile and an error message is dispatched to the server 30. When the public key PK.DP.TLS is verified authentic, the mutual authentication phase continues as described previously. It is also conceivable to perform this verification of the public key PK.DP.TLS during step E4.

The description has been given in a particular case where three different public key certificates are used for the implementation of the downloading method. The embodiments and their variants described are transposable by the person skilled in the art to an embodiment in which a single public key certificate (and therefore a single pair of secret and public keys) is used for all of the exchanges (secure connection, authentication, downloading properly speaking).

The description has also been given in an embodiment where a phase of mutual authentication between the server 30 and the security module 20 is implemented. Of course it is also possible to implement the downloading method with solely an authentication of the server by the security module, or indeed without authentication.

The description has been given in an embodiment comprising an establishment of a secure downloading session, in the course of which session keys are generated jointly between the server 30 and the security module 20 and in which the server is authenticated by the security module by means of a public downloading key. More precisely, the establishment of the secure downloading session is triggered by a reception by the security module of a request to open a secure downloading session, this request comprising a one-time public key, generated by the server, for a matching of session keys and a signing of the data of this request by means of a private downloading key, with which the public downloading key is associated, of the server. Verification of the authenticity of the public downloading key is performed by means of the first verification datum.

Figure 2B:
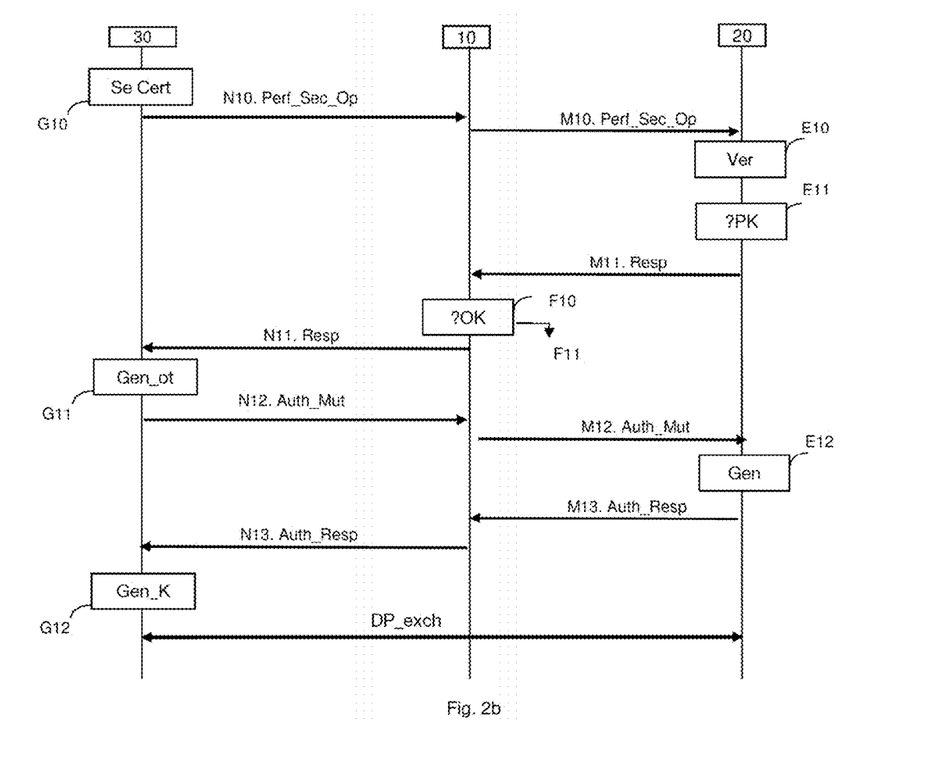
FIG. 2b illustrates another exemplary implementation of establishment of a secure downloading session.

FIG. 2b illustrates another exemplary implementation of establishment of a secure session. This other example is defined in the technical specification "GlobalPlatform Card-Secure Channel Protocol '11'—Card Specification v2.2—Amendment F" version 1.0, published by the body Global-Platform. FIG. 2b corresponds to the establishment of a secure session, represented in FIG. 4-2 (SCP11a Protocol Overview) of this specification. The server 30 corresponds to an entity OCE (for "Off Card Entity"). Its public downloading key certificate is denoted hereinafter CERT.DP.ECKA. The server 30 has at its disposal a pair of keys comprising a private key SK.DP.ECKA specific to the server 30 and an associated public key PK.DP.ECKA. The public key certificate CERT.DP.ECKA has been issued by the certificate issuer 40 to certify the public key PK.DP.ECKA.

The security module 20 corresponds to a device SD (for "Secure Device"). It has at its disposal a pair of keys: a private key SK.EUICC.ECKA and an associated public key PK.EUICC.ECKA. The public key certificate is denoted CERT.EUICC.ECKA.

In a step G10, the server 30 dispatches destined for security module 20 its certificate CERT.DP.ECKA signed by the certificate issuer 40 in a request N10 for execution of a security operation ("Perform Security Operation"). This request comprises in the certificate the public downloading key PK.DP.ECKA intended to contribute to the generation of the session keys. The provision of the certificate makes it possible to authenticate the server 30 during the establishment of the secure session. This message N10 travels via the user device 10 and is retransmitted in the form of a message M10 to the security module.

In a step E10, the security module 20 verifies the certificate CERT.DP.ECKA. If this verification is positive, in a step E11, the security module 20 extracts the certificate's public key PK.DP.ECKA and verifies whether the latter is authentic by means of the first verification datum. If such is not the case, the security module 20 interrupts the establishment of the secure downloading session and dispatches an error message to the user device 10, this error message bringing about an interruption of the downloading of the access profile by the user device. If such is the case, the server 30 having indeed used the public downloading key required by the network operator, the security module 20 dispatches to the user device 10 a message M11 of response to the request for execution of a security operation. Steps F10 and F11 are respectively similar to steps F7 and F8 previously described.

The establishment of the secure session continues via a step G11 in the course of which the server 30 generates a one-time key pair (eSK.DP.ECKA, ePK.DP.ECKA) and dispatches the one-time public key ePK.DP.ECKA in a mutual authentication message N12 ("Mutual Authenticate") to the user device 10, which relays it in a message M12 to the security module 20.

In a step E12, the security module 20 generates a one-time key pair (eSK.EUICC.ECKA, ePK.EUICC.ECKA) and calculates a first value ShSs on the basis of PK.DP.ECKA and SK.EUICC.ECKA, and then a second value ShSe on the basis of ePK.DP.ECKA and eSK.EUICC.ECKA. The security module 20 thereafter derives session keys, for example AES (for "Advanced Encryption Standard") session keys, on the basis of the first and second values. It is noted here that the public downloading key PK.DP.ECKA is used to calculate the session keys. The verification of the authenticity of the latter in step E11 makes it possible to secure the calculation of the session keys. The security module 20 also calculates a receipt.

The security module 20 dispatches to the user device 10 in a message M13 an authentication response comprising the one-way public key generated ePK.EUICC.ECKA and the receipt. The user device 10 relays the message M13 in the form of a message N13 to the server 30.

The server 30 receives the message M13 in a step G12 and calculates a first value ShSs on the basis of PK.eUICC.ECKA and SK.DP.ECKA, and then a second value ShSe on the basis of ePK.eUICC.ECKA and eSK.DP.ECKA. The security module 20 thereafter derives, for example AES, session keys on the basis of the first and second values. Next it verifies the receipt.

The access profile can then be downloaded to the security module by means of the secure downloading session.

It is recalled here that these various embodiments have been described while distinguishing the user device 10 from the security module 20. In other embodiments, which are deduced naturally from this description, the user device 10 and the security module 20 form a single entity.

No limitation is attached to these various embodiments and the person skilled in the art is able to define others by combining during a downloading of a network access profile a verification of the authenticity of a public key of a server by means of a verification datum provided by an operator of the network and an interruption of the downloading of the access profile when the public key is not verified authentic.

Thus, for the implementation of the downloading method, in a particular embodiment, the security module 20, 21 intended to be associated with a user device 10, 11 comprises:

- a send/receive sub-module, designed to communicate with the user device, to obtain a first verification datum prepared by a network operator and obtained by the user device;
- a control sub-module, designed to establish a secure downloading session, in the course of which session keys are generated jointly between a server, at which an access profile prepared by said network operator is available for downloading, and the security module and in which the server is authenticated by the security module by means of a public downloading key, to verify the authenticity of the server's public downloading key by means of the first verification datum and to trigger an interruption of the downloading of the access profile by the user device by dispatching an error message when the public downloading key is not verified authentic.

Verification of the authenticity of the public downloading key allows the control sub-module to verify that the server uses a secret downloading key corresponding to that envisaged by the network operator during the preparation of the first verification datum.

In a particular embodiment, the control sub-module is also designed to verify the authenticity of a public authentication key of the server by means of the second authentication datum and to trigger an interruption of the downloading of the access profile by the dispatching of an error message to the user device.

Verification of the authenticity of the public authentication key allows the control sub-module to verify that the server uses a secret authentication key corresponding to that envisaged by the network operator during the preparation of the second verification datum.

In a particular embodiment, the control sub-module is also designed to verify the authenticity of a public key used in a secure connection TLS of the server by means of the third authentication datum and to trigger an interruption of the downloading of the access profile by the dispatching of an error message to the user device when the public key PK.DP.TLS is not verified authentic.

Verification of the authenticity of the public key used in a secure connection TLS allows the control sub-module to verify that the server uses a secret key in a secure connection TLS corresponding to that envisaged by the network operator during the preparation of the third verification datum.

Various sub-modules can play the role of this control sub-module. The sub-module ISD-R 203 can for example interact with the sub-module ECASD to instruct the latter as regards verification of the authenticity of the public keys for downloading, authentication and secure connection TLS as a function respectively of the first, second and third verification data. In another exemplary embodiment, the sub-module ISD-R can also implement these verifications itself.

In a particular embodiment, the mobile terminal is made up of a user device 10, designed to communicate with a server at which an access profile prepared by a network operator is available for downloading, and of a security module 20 such as described previously.

In a particular embodiment, as described previously, the security module can be integrated into the terminal. Thus, the mobile terminal is designed to communicate with a server at which an access profile prepared by a network operator is available for downloading and comprises:

- a module for obtaining a first verification datum prepared by said network operator;
- a control module, designed to establish a secure downloading session, in the course of which session keys are generated jointly between the server and the terminal and in which the server is authenticated by the terminal by means of a public downloading key, to verify the authenticity of a public downloading key of the server by means of the first verification datum and to trigger an interruption of the downloading of the access profile by the dispatching of an error message when the public downloading key is not verified authentic.

Verification of the authenticity of the public downloading key allows the control module to verify that the server uses a secret downloading key corresponding to that envisaged by the network operator during the preparation of the first verification datum.

The particular embodiments described previously for the security module are also applicable to the terminal.

The technique for downloading an access profile is implemented by means of software components and/or hardware components. In this regard, the term "module" can correspond in this document either to a software component, or to a hardware component or to a set of hardware components and/or software components, able to implement a function or a set of functions, according to what is described previously for the module concerned.

A software component corresponds to one or more computer programs, one or more subprograms of a program, or more generally to any element of a program or of a piece of software. Such a software component is stored in memory and then loaded and executed by a data processor of a physical entity and is able to access the hardware resources of this physical entity (memories, recording media, communication buses, electronic input/output cards, user interfaces, etc).

In the same manner, a hardware component corresponds to any element of a hardware assembly. It may be a programmable or non-programmable hardware component, with or without integrated processor for the execution of software. It is for example an integrated circuit, a chip card, an electronic card for the execution of firmware, etc.

In a particular embodiment, the sub-modules 202, 203, 204 are designed to implement the downloading method described previously. They are preferably software modules comprising software instructions for executing those of the steps of the previously described downloading method that are implemented by a security module. The invention therefore also relates to:

- a program for a security module, comprising program code instructions intended to drive the execution of the steps of the downloading method previously described, when said program is executed by this security module;
- a recording medium readable by a security module on which the program for a module is recorded.

The invention therefore also relates to:

a program for a terminal, comprising program code instructions intended to drive the execution of the steps of the previously described downloading method, when said program is executed by this terminal;

a recording medium readable by a terminal on which the program for a terminal is recorded.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

Although the present disclosure has been described with reference to one or more examples, workers skilled in the art will recognize that changes may be made in form and detail without departing from the scope of the disclosure and/or the appended claims.

The invention claimed is:

1. A downloading method comprising:
    downloading an access profile for access to a communication network by a security module, said access profile being prepared for a user by a network operator and available at a server configured to provide by downloading to the security module said access profile, said downloading comprising:
    obtaining by the security module a first verification datum prepared by said network operator, the verification datum corresponding to a digest of a public downloading key of the server;
    establishing a secure downloading session by the security module for downloading the access profile, in the course of which session keys are generated jointly between the server and the security module and in which the server signs data by using a private downloading key with which the public downloading key is associated, and the security module authenticates the server by verifying said signed data by using said public downloading key;
    after establishing the session, verifying by the security module authenticity of the server's public downloading key by using the first verification datum, wherein the security module verifies that the public downloading key of the server corresponds to a public downloading key envisaged by the network operator during preparation of the first verification datum; and
    in response to the public downloading key being not verified authentic, interrupting the downloading of the access profile.

2. The downloading method as claimed in claim 1, in which the establishing the secure downloading session is triggered by a reception by the security module of a request to open a secure downloading session, said request comprising a one-time public key, generated by the server, for a matching of the session keys and wherein the data signed by the server comprises data of said request.

3. The downloading method as claimed in claim 2, in which the verifying of the authenticity is performed during a reception by the security module of a request for preparation of the downloading, said request comprising a public downloading key certificate of the server, prior to the receiving of the request to open a secure downloading session.

4. The downloading method as claimed in claim 2, in which the security module furthermore obtains a second verification datum, verifies by using the second verification datum a public authentication key of the server, received during a phase of authentication of the server by the security module, and when the public authentication key is not verified authentic, interrupts the downloading of the access profile.

5. The downloading method as claimed in claim 4, in which the verifying of the authenticity of the public authentication key is performed during the phase of authentication of the server by the security module.

6. The downloading method as claimed in claim 4, in which the verifying of the authenticity of the public authentication key is triggered subsequent to the reception of the request to open a secure downloading session.

7. The downloading method as claimed in claim 1, in which the establishing of the secure downloading session is triggered by a reception by the security module of a request for executing a security operation, said request comprising the public downloading key intended to contribute to the generation of the session keys.

8. A security module comprising:
    a processor; and
    a non-transitory computer-readable medium comprising instructions stored thereon, which when executed by the processor configure the security module to perform acts comprising:
    obtaining a first verification datum prepared by a network operator, the verification datum corresponding to a digest of a public downloading key of a server;
    establishing a secure downloading session for downloading an access profile, in the course of which session keys are generated jointly between the server and the security module, wherein the access profile is prepared by said network operator and is available at the server for downloading, and in the course of which the server signs data by using a private downloading key with which the public downloading key is associated, and the security module authenticates the server by verifying said signed data by using the public downloading key;
    verifying authenticity of the server's public downloading key by using the first verification datum, wherein the security module verifies that the public downloading key of the server corresponds to a public downloading key envisaged by the network operator during preparation of the first verification datum; and
    triggering an interruption of downloading of the access profile in response to the public downloading key being not verified authentic.

9. A mobile terminal, designed to communicate with a server at which an access profile prepared by a network operator is available for downloading, said mobile terminal comprising:
    a security module;
    a processor; and
    a non-transitory computer-readable medium comprising instructions stored thereon, which when executed by the processor configure the mobile terminal to perform acts comprising:
    obtaining a first verification datum prepared by said network operator, the verification datum corresponding to a digest of a public downloading key of the server; and
    establishing a secure downloading session by the security module for downloading the access profile, in the course of which session keys are generated jointly between the server and the security module and in which the server signs data by using a private downloading key with which the public downloading key is associated, and the security module authenticates the server by verifying said signed data by using said public downloading key;

verifying by the security module authenticity of the server's public downloading key by using the first verification datum, wherein the security module verifies that the public downloading key of the server corresponds to a public downloading key envisaged by the network operator during preparation of the first verification datum; and in response to the public downloading key being not verified authentic, interrupting the downloading of the access profile.

10. A non-transitory recording medium readable by a security module and on which a program is recorded, the program comprising instructions which when executed by a processor of the security module configure the security module to perform acts comprising:

downloading an access profile for access to a communication network by the security module, said access profile being prepared for a user by a network operator and available at a server configured to provide by downloading to the security module said access profile, said downloading comprising:

obtaining by the security module a first verification datum prepared by said network operator, the verification datum corresponding to a digest of a public downloading key of the server;

establishing a secure downloading session for downloading the access profile, in the course of which session keys are generated jointly between the server and the security module and in which the server signs data by using a private downloading key with which the public downloading key is associated, and the security module authenticates the server by verifying said signed data by using said public downloading key;

verifying by the security module authenticity of the server's public downloading key by using the first verification datum, wherein the security module verifies that the public downloading key of the server corresponds to a public downloading key envisaged by the network operator during preparation of the first verification datum; and in response to the public downloading key being not verified authentic, interrupting the downloading of the access profile.

* * * * *